(No Model.)
A. J. ROBINSON.
GROMMET.
No. 422,633.  Patented Mar. 4, 1890.
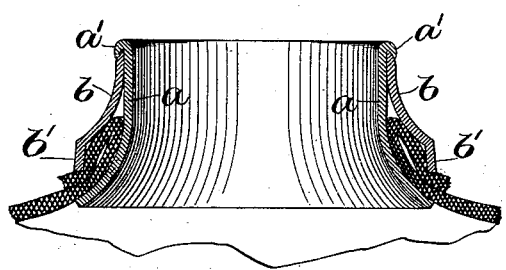
WITNESSES
Howard F. Eaton.
Frederick L. Emery.
INVENTOR
Andrew J. Robinson,
by Crosby & Gregory
Attys.

UNITED STATES PATENT OFFICE.

ANDREW J. ROBINSON, OF BOSTON, MASSACHUSETTS.

GROMMET.

SPECIFICATION forming part of Letters Patent No. 422,633, dated March 4, 1890.

Application filed November 18, 1889. Serial No. 330,661. (No model.)

*To all whom it may concern:*

Be it known that I, ANDREW J. ROBINSON, of Boston, county of Suffolk, State of Massachusetts, have invented an Improvement in Grommets, of which the following description, in connection with the accompanying drawing is a specification, like letters on the drawing representing like parts.

This invention has for its object to construct a grommet which may be cheaply made and easily put together.

In accordance with this invention the grommet is composed of two tapering collars or parts arranged one within the other, the outer one being shorter than the inner one. The outer tapering collar at one end is bent inwardly or toward the corresponding flaring end of the inner collar, so that when pressed down over the inner collar a small contracted space is presented between them at the said flaring or bent end to receive the material to be clamped, said space becoming narrower the more the outer collar is pressed down, thereby pinching the material as firmly as desired. The opposite or upper end of the inner collar extends beyond the corresponding or upper end of the outer collar, and when the said outer collar is pressed down firmly upon the material said upper end of the inner collar is turned down over the upper edge of the outer collar to hold the latter down in place.

The drawing shows in vertical section a grommet embodying this invention.

The inner collar $a$ is made tapering, substantially, from end to end. The outer collar $b$ is also made tapering, but is much shorter than the collar $a$. The lower end of the collar $b$ is bent or turned down, as at $b'$, in a direction toward the corresponding end of the collar $a$.

The material to be clamped is placed between the lower ends of the collars $a\ b$, and the collar $b$ is pressed down onto it. The more it is pressed the tighter it pinches the material. The upper end of the inner collar extends beyond the upper end of the collar $b$, and when the latter is pressed down into the desired position the said upper end of the inner collar is turned down, as at $a'$, over the upper edge of the outer collar to thereby hold it down.

The two collars $a\ b$ may be made of sheet metal and pressed into suitable position with dies.

I claim—

A grommet consisting of a tapering collar $a$ and an outer collar $b$, made shorter than the collar $a$ and having a bent end $b'$, the material to be clamped being placed between the said bent end $b'$ and the larger end of the collar $a$, and the flange $a'$ on the collar $a$, which is pressed down over the upper edge of the outer collar $b$ after the material is placed in position, to thereby hold the parts assembled, substantially as described.

In testimony whereof I have signed my name to this specification in the presence of two subscribing witnesses.

ANDREW J. ROBINSON.

Witnesses:
   BERNICE J. NOYES,
   GRACE A. ROBINSON.